United States Patent
Youn et al.

(10) Patent No.: US 9,037,135 B2
(45) Date of Patent: May 19, 2015

(54) METHOD FOR HANDOVER OF MOBILE TERMINAL

(71) Applicant: SUNGKYUNKWAN UNIVERSITY Research & Business Foundation, Suwon-si (CN)

(72) Inventors: Hee Yong Youn, Seongnam-si (KR); Hwi Woon Jeong, Seongnam-si (KR); Jun Yeol Choi, Daegu (KR); Hyung Ku Kang, Hanam-si (KR); Hee Seong Kim, Seoul (KR)

(73) Assignee: Sungkyunkwan University Research & Business Foundation, Suwon-si (KR)

( * ) Notice: Subject to any disclaimer, the term of this patent is extended or adjusted under 35 U.S.C. 154(b) by 79 days.

(21) Appl. No.: 13/754,980

(22) Filed: Jan. 31, 2013

(65) Prior Publication Data

US 2013/0196660 A1 Aug. 1, 2013

(30) Foreign Application Priority Data

Jan. 31, 2012 (KR) .................. 10-2012-0009690

(51) Int. Cl.
*H04W 4/00* (2009.01)
*H04W 36/16* (2009.01)
*H04W 8/18* (2009.01)

(52) U.S. Cl.
CPC .......... *H04W 36/165* (2013.01); *H04W 8/186* (2013.01)

(58) Field of Classification Search
CPC ... H04W 4/06; H04W 36/18; H04W 36/0055; H04W 36/24; H04W 36/0016
USPC ................. 455/434, 436, 418, 419, 41.2
See application file for complete search history.

(56) References Cited

U.S. PATENT DOCUMENTS

| | | | | |
|---|---|---|---|---|
| 6,490,452 B1 * | 12/2002 | Boscovic et al. | ............ | 455/436 |
| 8,208,444 B2 * | 6/2012 | Zou et al. | ............ | 370/331 |
| 8,537,193 B1 * | 9/2013 | Habib et al. | ............ | 348/14.01 |
| 2006/0003784 A1 * | 1/2006 | Chion et al. | ............ | 455/518 |
| 2007/0249347 A1 * | 10/2007 | Saifullah et al. | ............ | 455/436 |
| 2007/0291702 A1 * | 12/2007 | Nanba et al. | ............ | 370/336 |
| 2011/0136534 A1 * | 6/2011 | Nanba et al. | ............ | 455/522 |
| 2012/0100852 A1 * | 4/2012 | Horn | ............ | 455/436 |
| 2013/0130684 A1 * | 5/2013 | Gomes et al. | ............ | 455/435.1 |
| 2013/0143578 A1 * | 6/2013 | Lekutai | ............ | 455/444 |

FOREIGN PATENT DOCUMENTS

WO  WO 2010/022560 A1 *  3/2010  ........... H04W 48/04

OTHER PUBLICATIONS

Machine Translation of WO2010022560 Method and Apparatus for group handover in wireless network (9 pages).*

* cited by examiner

*Primary Examiner* — Kamran Afshar
*Assistant Examiner* — Mong-Thuy Tran
(74) *Attorney, Agent, or Firm* — NSIP Law

(57) ABSTRACT

Disclosed herein is a method for handover of a mobile terminal. In the method, a group of mobile terminals for handover is formed by grouping a plurality of mobile terminals. A first terminal of the group scans a target base station. One or more other terminals of the group perform handover to the target base station using the scan information of the first terminal.

15 Claims, 6 Drawing Sheets

METHOD FOR HANDOVER OF MOBILE TERMINAL

CROSS-REFERENCE TO RELATED APPLICATIONS

This application claims the benefit under 35 USC 119(a) of Korean Patent Application No. 10-2012-0009690, filed on Jan. 31, 2012, in the Korean Intellectual Property, the entire disclosure of which is incorporated herein by reference for all purposes.

BACKGROUND OF THE INVENTION

1. Field of the Invention

The present invention relates generally to a method for the handover of a mobile terminal and, more particularly, to a handover method that is capable of reducing the handover time and the number of packets that are required to scan channels, and also reducing the amount of traffic that is imposed on a base station by sharing base station information through grouping.

2. Description of the Related Art

With a sharp increase in the use of mobile services, an IEEE 802.11 wireless local area communication network (WLAN) has emerged as an effective alternative to a local area communication network (LAN).

Mobility support in a conventional IEEE 802.11 environment, such as a home or small office network, is not a serious issue because a single access point is often sufficient.

For the quality of service (QoS) demanded by real-time applications such as VoIP and multimedia, however, seamless handover support has become an important requirement for mobility.

802.16e-based wireless networks can be used in various places such as institutions of higher learning, restaurants, and shops. Actually, numerous cities, including San Francisco, Paris, and Hong Kong, have made plans for deploying such networks that can cover entire city areas. Here, the connectivity is based on self-organizing ad-hoc networks that enable autonomous multi-hop communication between the devices. The devices are able to exchange data even over multiple intermediate devices by handover.

Accordingly, handover is a significant mechanism that is required to fulfill the requirement of constant data transfer when mobile stations (MSs) cross the area overlapped between adjacent base stations (BSs) of wireless networks.

Handover is classified into mobile station (MS) handover and base station (BS) handover according to the device which starts it first. The present invention is intended for MS handover. Handover requires the exchange of data among BSs, which is described in the 802.16e standard.

From among candidate BSs for handover, the most appropriate BS is selected as a target BS. An MS that requires handover sends a message to a serving BS. The message includes the identifier of the target BS.

WiMAX needs to efficiently support the mobility of an MS. Most research into handover aims to reduce delay that occurs during handover.

In related preceding paper 1, Sik Choi, Gyung-Ho Hwang, Taesoo Kwon, Ae-Ri Lim and Dong-Ho Cho, "Fast Handover Scheme for Real-Time Downlink Services in IEEE 802.16e BWA System," Vehicular Technology Conference, 2005, vol. 3, pp. 2028-2032, the authors suggest a scheme for reducing the time for waiting for down-link packets during a handover process. In this scheme, packets are transmitted between an MS and a BS without verification. In a scheme, an MS forcibly selects a target BS in order to reduce the handover waiting time. Although this scheme can reduce the time it takes to search for a BS and perform synchronization with the BS, it is problematic in that frequent re-scanning resulting from rapid changes in a mobile environment causes time overhead. Furthermore, the probability of handover dropping may increase the time limit.

In related preceding paper 2, Jui-Hung Yeh, Jyh-Cheng Chen, PrathimaAgrawal, "Fast Intra-Network and Cross-Layer Handover (FINCH) for WiMAX and Mobile Internet," IEEE Transactions on Mobile Computing, April 2009, there is disclosed a scheme that uses active and passive scans at the same time. However, this scheme still requires a lot of active scanning, which is as slow as passive scanning.

Recently, Predictive Channel Reservation (PCR) techniques, for example, a distance and time-based resource reservation technique, were proposed so as to reserve resources. However, these techniques have the problem of increasing the probability of blocking new handover requests and the number of messages required for handover.

SUMMARY OF THE INVENTION

Accordingly, the present invention has been made keeping in mind the above problems occurring in the prior art, and an object of the present invention is to provide a method for the handover of a mobile terminal that is capable of performing fast handover and reducing the amount of traffic.

In accordance with an aspect of the present invention, there is provided a method for the handover of a mobile terminal, including forming a group of mobile terminals for handover by grouping a plurality of mobile terminals; scanning, by a first terminal of the group, a target base station; and performing, by one or more other terminals of the group, handover to the target base station using the scan information of the first terminal.

The plurality of mobile terminals may include at least one mobile terminal in a state of having information about the target base station necessary for handover (WS state), one or more mobile terminals in a state of needing to acquire the information about the target base station from the mobile terminal in WS state (WI state), and one or more mobile terminals in a normal state before handover (N state).

In the group of mobile terminals, the at least one mobile terminal in WS state may be one in number, and the one or more mobile terminals in WI state may be one or more in number.

The mobile terminal in WS state may have remaining time expressed by the following Equation (a):

$$\tau_m = \text{Max}(\theta | S^m(\theta) = m), \text{ for } m=1, 2, 3, \quad (a)$$

where $\tau_m$ is the remaining time, $\theta$ is a random function, and S is the number of groups that maximizes the number of channel reservations.

S may be obtained by the following equation (b):

$$S = -1/ln(1 - F_{fx(\theta)}(T)) \quad (b)$$

where $F_{fx(\theta)}(T)$ is a cumulative distribution function representative of the actual probability of the mobile terminal arriving within time T.

Scanning, by the first terminal of the group, the target base station may include synchronization, ranging and certification processes that are defined in the IEEE 802.16e standard.

The mobile terminals in WI state may perform handover to the target base station using handover and channel scanning that have been performed by the mobile terminal in WS state.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Handover is a critical issue for real-time applications in the field of wireless networks. The present invention proposes a novel handover method that is capable of reducing the handover time and the number of packets that are required to scan channels and also reducing the amount of traffic that is imposed on a base station by sharing base station information through grouping.

The above handover method is based on the concept of BS channel reservation using a group-based channel scan technique. The BSs select the number of channels, and an MS of each group, including MSs, acquires information about a target BS in advance.

The other MSs of the group use the information that is acquired in advance. The proposed group-based handover method can effectively reduce the amount of traffic and the handover time.

Embodiments of the present invention will be described below in detail with reference to the accompanying drawings. However, in the following description of the embodiments, detailed descriptions of related known functions or configurations that would make the gist of the present invention obscure will be omitted.

1. Channel Scan

In the IEEE 802.16e standard, channel scanning includes synchronization, ranging and certification processes.

First, in the synchronization process, an MS receives a DLMap (Downlink-Map), a UL-Map (Up-Link-Map), a DCD (Downlink Channel Descriptor), and a UCD (Up-Link Channel Descriptor) from a neighbor BS. All BSs broadcast DL-Map and UL-Map messages in each frame so as to efficiently distribute resources. Each MS recognizes the fields of the BSs so as to perform downlink and uplink data transmission. The DCD and UCD include the physical information of the downlink data and the physical information of the uplink data, respectively. A single transmission cycle takes a few seconds. After the synchronization and ranging processes have been terminated, the MS adjusts transmission power depending on the neighbor BS.

Figure 1:
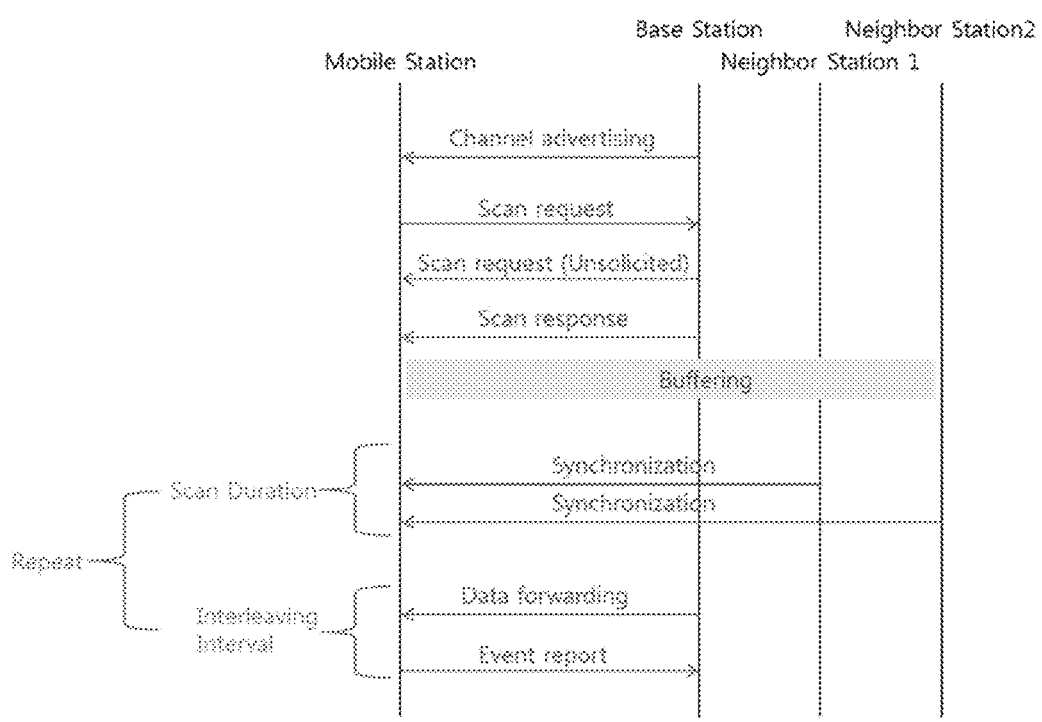
FIG. 1 is a diagram illustrating a scan process in accordance with the IEEE 802.16e standard.

FIG. 1 shows the overall scanning process of an MS. A BS advertises the channel of neighbor BSs (channel advertisement). The advertisement message includes the DCD and UCD information on the neighbor BSs. The BS and neighbor BSs exchange the information with each other. They also broadcast the exchanged information to the MSs that belong to themselves.

Here, the BS and the neighbor BSs help the MSs acquire the exchanged information without waiting for a long period of time. The scan process is requested by the MS (a scan request), or scheduled according to the decision of the BS that observes the state of the MS (a scan request (unsolicited)). After a scanning schedule has been decided, it is included in a scan response message.

The scanning schedule includes three sections. First, the MS sends a scan request to the neighbor BSs. The data to be sent to the MS is buffered in the BS. Second, in the interleaving section, the MS performs a normal operation.

The buffered data is forwarded to the MS via the scan section from the interleaving section. The scanning section and the interleaving section occur repeatedly because an MS cannot be completely certain that it can scan all neighbor channels in a single scan section.

The number of repetitions allowed is defined using the parameter "repeat." The results of the scan are periodically sent to the BS or notified of when an event occurs during the scan section. Through these operations, the MS determines a target BS appropriate for handover.

2. Overview of Group Behavior Scanning

The present invention proposes a group-based scan method. This method scans BS channels by grouping MSs in an adjacent area. This method is based on the fact that if there is an MS attempting to scan channels, adjacent MSs may utilize the results of the previous scan.

Figure 2:
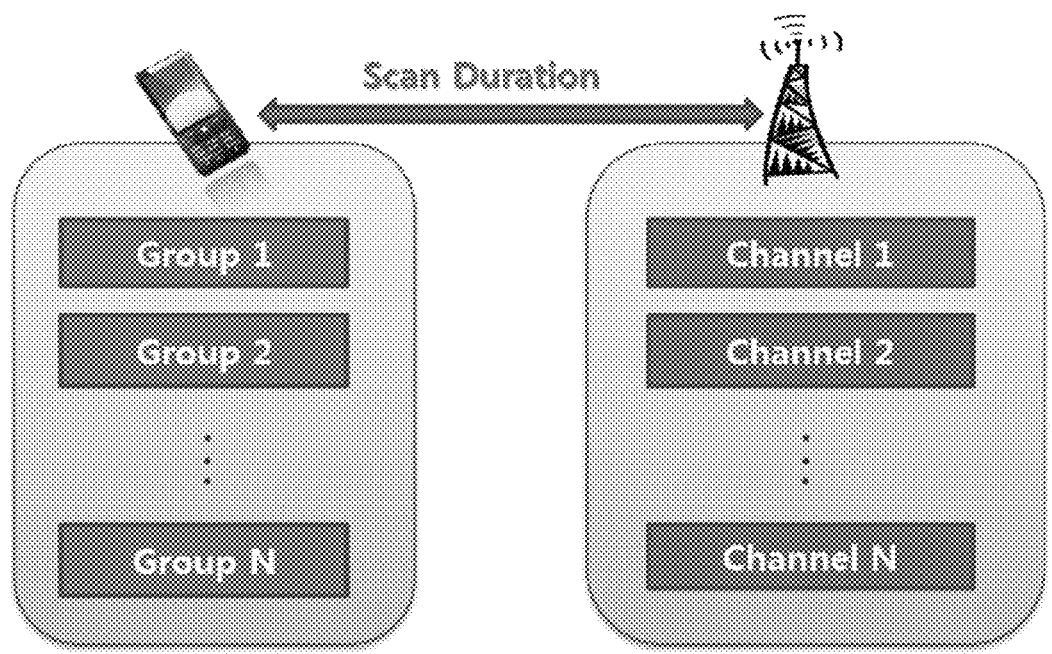
FIG. 2 is a conceptual diagram illustrating a group scan process in accordance with an embodiment of the present invention.

FIG. 2 illustrates groups of MSs, and the channel list of a BS which will be used by the groups.

If there are groups of MSs around an MS requiring scanning, schedule information including the MS and the groups of MSs is sent to the BS.

Each MS of each group is in one of the following three states.

N: the normal state before handover

WS: the state in which the MS has information about the BS that is necessary for handover WI: the state in which the MS needs to acquire the information about the BS from the MS in WS state The BS performs group-based reservation. This is intended to flexibly assign the most potent target BS to the MS in WS state.

In this embodiment, the remaining time is considered to be the random variable θ until the handover is terminated. The probability distribution function (pdf) of θ is defined as X(θ). The actual probability of the MS arriving within time T is defined as the following cumulative distribution function (cdf):

$$F_{fx(\theta)}(T) = \int_0^T f_{X(\theta)}(x)dx \quad (1)$$

3. Formation of Groups

Figure 3:
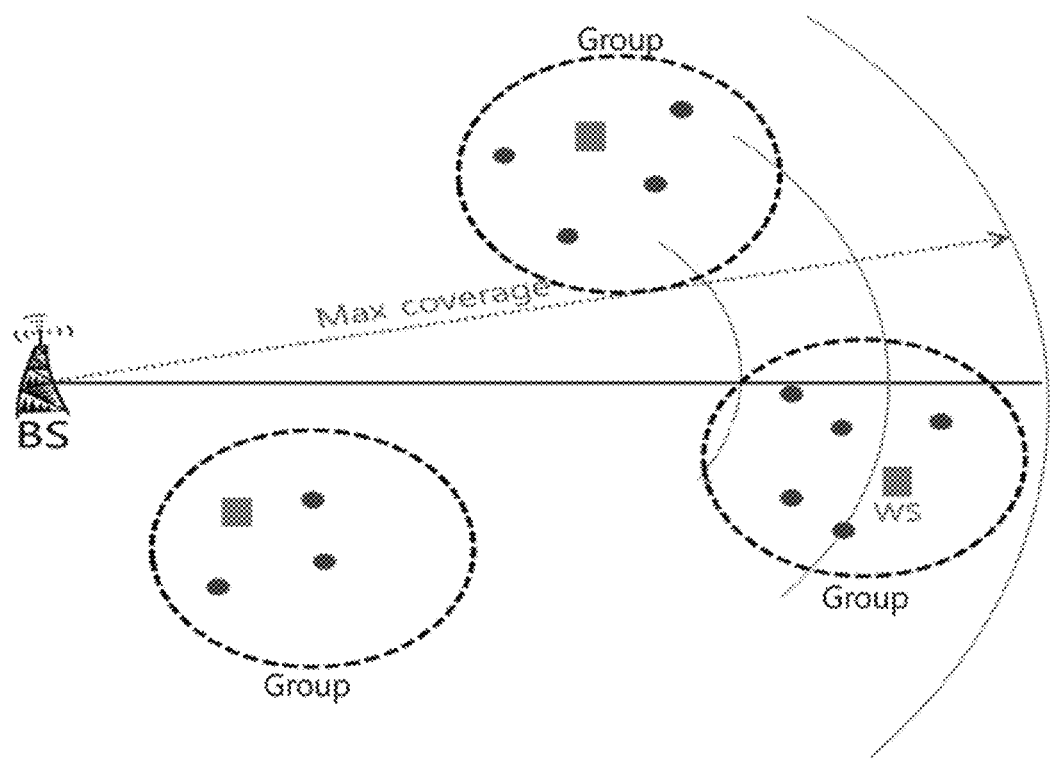
FIG. 3 is a diagram illustrating an example of grouping a plurality of mobile terminals to perform handover.

The received signal strength (RSS) threshold is used to form the MSs group, as shown in FIG. 3.

A box in a group represents an MS in WS state, while circles represent MSs in WI state. Each MS checks the RSS of another MS's Up-Link section to receive data from the other MS. The UL-MAP message is used to send data including a bandwidth request.

First, the BS first broadcasts information on the allocation of the Up-Link section of the MS. The BS also indicates its ID and the number of channels it carries. All MSs that have received the messages attempt to sense the Up-Link section. This enables groups of MSs to be effectively created. It allows the fast handover of neighbor MSs, and decreases the traffic of the BS by reducing requests from the MSs.

Figure 4:
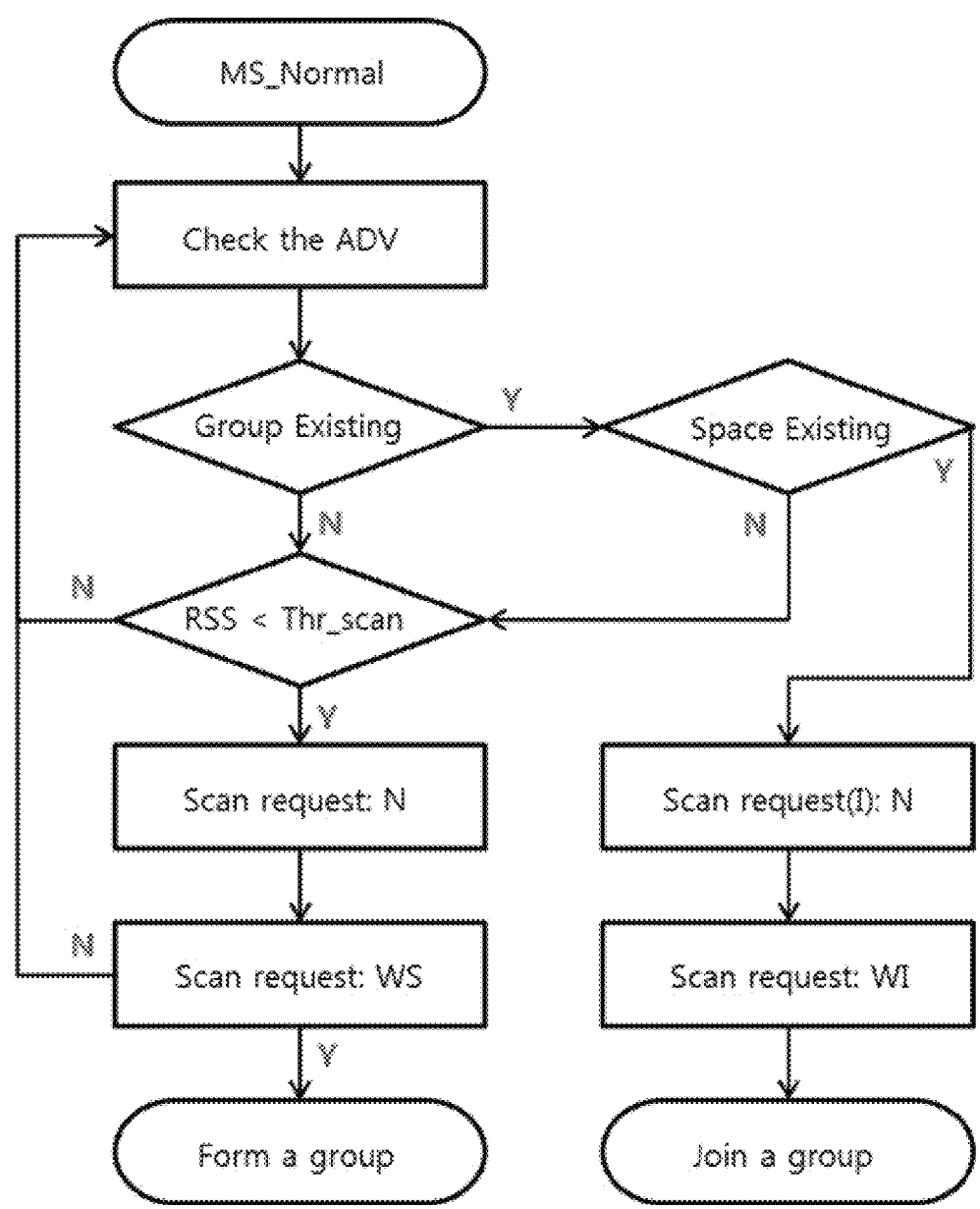
FIG. 4 is a flowchart illustrating a process of forming groups of MSs in accordance with an embodiment of the present invention.

FIG. 4 illustrates a process of group formation. The BS periodically broadcasts the information to the existing groups, or the information of existing groups is unicasted in response to a request from a specific MS.

The MS checks the existing MS scanning groups before requesting the scan schedule. If some groups exist, then the MS determines whether a group is close to it or not by checking the Up-Link signal. Based on the determination, the MS sends a request message for the scan schedule. When the BS receives it, it performs resource reservation if a channel is available. Otherwise the request is blocked.

4. BS Channel Management Scheme

Each MS has different remaining time $F_{fx(\theta)}(T)$. The value of $F_{fx(\theta)}(T)$ is used to determine the order of resource reservation, which is required to request the handover. The larger the value of $F_{fx(\theta)}(T)$, the higher the likelihood of resource reservation.

Excessive resource reservation may cause an overload in the target BS. In contrast, insufficient reservation increases the probability of a handover request dropping.

The MS in WS state reserves a channel. Actual channel allocation is limited by the resources that are reserved by the group.

The MS in WS state reserving the channels is expressed by the function of $\theta$, and the probability $P_N^{uT}(\theta)$ of channels being reserved within T is expressed as follows:

$$P_N^{uT}(\theta) = P[(X_1(\theta), X_2(\theta), \ldots, X_N(\theta)) \le T] \quad (2)$$
$$= 1 - P[X_1(\theta), X_2(\theta), \ldots, X_N(\theta)) \ge T]$$

In Equation (2), $X_N(\theta)$ is a random variable representative of a handover request from an N-th MS. Since $X_N(\theta)$ is independent, $P_N^{uT}(\theta)$ is expressed as follows:

$$P_N^{uT}(\theta) = 1 - (1 - F_{fx(\theta)}(T))^N \quad (3)$$

From Equation (3), it can be seen that if the number of MSs in a group is large, the probability of resource reservation will be increased. Meanwhile, if the number of handovers occurring during T is larger than the number of available channels, the MS cannot reserve the resources anymore. To solve this problem, when a group is formed, the number of MSs in WS state is limited to one.

Next, the number S of groups that maximizes the number of channel reservations will be described. The value S is expressed as follows:

$$S = -1/\ln(1 - F_{fx(\theta)}(T)) \quad (4)$$

In Equation (4), the value $\theta$ is related to the number of groups. Each MS in WS state that expects handover is considered to follow the following criteria:

$$\tau_m = \text{Max}(\theta | S^m(\theta) = m), \text{ for } m=1, 2, 3, \quad (5)$$

Here, $\tau_0$ is 0. The MS that has the remaining time larger than $\tau_{m-1}$ but smaller than $\tau_m$ makes it an m-th entry in the list. However, m should not be greater than the maximum predetermined number of reserved channels. The BS allows the formation of various groups based on the remaining time of the MSs, and reserves the resources. The MS having relatively small $\theta$ is put in a top level group. The MS having relatively large $\theta$ is put in a low level group, and can reserve resources earlier. Each MS in WS state has different channels that are reserved from the BS. It immediately performs a scan upon handover.

5. Group Scanning

When the groups are formed, each group scans the neighbor BS channels during the scheduled interval, which is assigned by the serving BS. Each MS in WS state provides notification of the results of the scan when the scan interval is terminated. The MS in WI state shares the results of the scan with other MSs in the same group. The MS in WS state may leave the group, and the BS needs to effectively manage other MS. The MS in WI state senses the MS in WS state, and uses its information. If the Up-Link message of the MS in WS state is lower than the threshold or is missed, the BS precludes the message of the MS and attempts to make a new schedule.

6. Embodiment (Simulation Results)

In order to evaluate the improvement of performance achieved by the proposed method, the time-based method was compared with the existing 802.16e scheme using a simulation. In the simulation, the number of total channels was 50, the number of maximum reservation resources was 5, and the channel holding time of the request was one minute.

Furthermore, $f_{X(\theta)}(x)$ was assumed to be the Gaussian distribution of average $\theta$ and standard deviation $\sqrt{\theta^2/3}$. The number of channels of the BS was randomly set.

In the simulation, the locations of the MS and the BS were maintained during regular intervals. When the MS periodically scanned the channels, it provided notification of the results of the scan once in every three scans. When the MS scanned the channels in response to the occurrence of an event, the MS always provided notification of the results of the scan. The simulation exhibited that the proposed scheme scanned the channels faster than the existing scheme.

Figure 5:
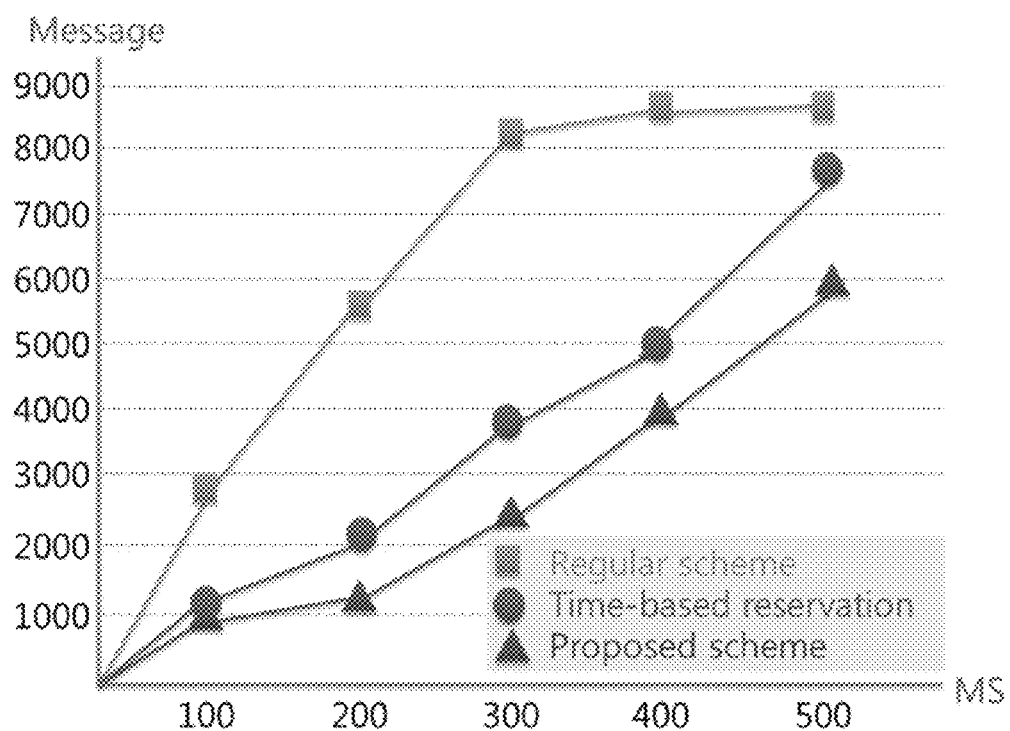
FIG. 5 is a simulation result graph illustrating the amount of traffic that is acquired by an MS in WS state in a group to search for a target BS channel in the network.

FIG. 5 illustrates the amount of traffic that is acquired by an MS in WS state in a group to search for a target BS channel in a network. Referring to FIG. 5, the simulation data can be acquired by five million iterations per MS. According to the results of the simulation, the existing scheme quickly reaches the maximum capacity as the number of MSs increases. If there exist a reasonably low number of MSs whose number is below 200, the traffic overhead of the proposed scheme is significantly low.

Figure 6:
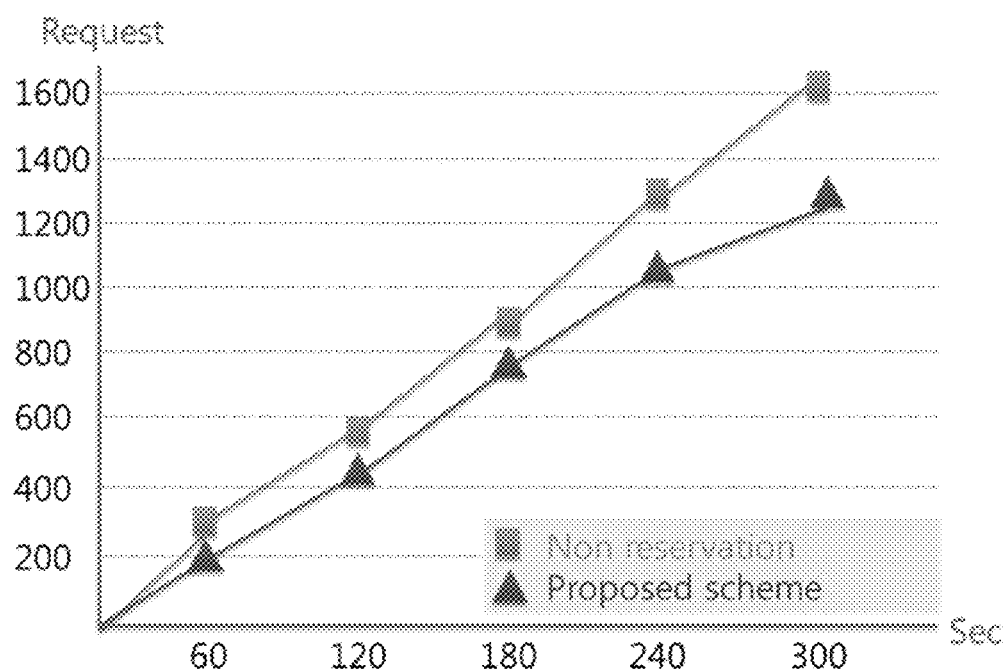
FIG. 6 is a graph comparing the numbers of scan requests that are required by 100 MSs in every 30 seconds in order to perform channel reservation.

FIG. 6 is a graph comparing the numbers of scan requests that are required by 100 MSs in every 30 seconds in order to perform channel reservation. Referring to FIG. 6, it shows that when the MS scans the BSs by the group, all the MSs in WI state in a group require a smaller number of requests than the existing scheme. This means that the group-based handover method proposed by the present invention ensures fast scanning. However, after the start of the first group scanning, the channel scanning of the next MS becomes slower because of the exhaustion of reserved resources. However, it does not cause a big problem in maintaining the network because the MS has already been connected to the BS.

As described above, in accordance with the embodiment of the present invention, the advantages of enabling handover from the serving BS to the target BS to be rapidly achieved while reducing the amount of traffic.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for handover of a mobile terminal, comprising:
   forming a group of mobile terminals for handover;
   scanning, by a first terminal of the group, a target base station; and
   performing, by one of the other terminals of the group, handover to the target base station using scan information of the first terminal, wherein in response to scanning, the first terminal is in a state of having information of the target base station necessary for handover and the first terminal has a remaining time of handover that is determined based on a number of groups that maximizes a number of channel reservations.

2. The method of claim 1, wherein the mobile terminals includes the mobile terminal in a state of having information about the target base station necessary for handover (WS state), a mobile terminal in a state of needing to acquire the information about the target base station from the mobile terminal in WS state (WI state), and a mobile terminal in a normal state before handover (N state).

3. The method of claim 2, wherein in the group Of mobile terminals, the mobile terminal in WS state is one in number, and the mobile terminal in WI state is one in number.

4. The method of claim 2, wherein the mobile terminal in WS state has remaining time expressed by the following Equation (a):

$$\tau_m = \text{Max}(\theta | S^m(\theta) = m), \text{for } m = 1, 2, 3, \quad (a)$$

where $\tau_m$ is the remaining time, $\theta$ is a random function, and S is a number of groups that maximizes a number of channel reservations.

5. The method of claim 4, wherein S is obtained by the following equation (b):

$$S = -1/\ln(1 - F_{fx(\theta)}(T)) \quad (b)$$

where $F_{fx(\theta)}(T)$ is a cumulative distribution function representative of an actual probability of the mobile terminal arriving within time T.

6. The method of claim 2, wherein the mobile terminals in WI state perform handover to the target base station using handover and channel scanning that have been performed by the mobile terminal in WS state.

7. The method of claim 2, wherein the target base station precludes an uplink message of the mobile terminal in WS state in response to the uplink message being lower than a threshold and remakes a scanning schedule.

8. The method of claim 1, wherein scanning, by the first terminal of the group, the target base station includes synchronization, ranging and certification processes that are defined in an IEEE 802.16e standard.

9. The method of claim 1, wherein the number of groups that maximizes the number of channel reservations is a cumulative distribution function representative of an actual probability of the mobile terminal arriving within a specified time.

10. The method of claim 1, wherein in response to the first terminal of the group scanning the target base station, the first terminal adjusts transmission power based on a neighbor base station of the target base station.

11. The method of claim 1, wherein the forming the group of mobile terminals for handover comprises periodically broadcasting information of an allocation of an uplink section of the mobile terminal, an identification information of the target base station, and a number of channels of the target base station.

12. The method of claim 1, wherein the mobile terminal requests a scan schedule from the target base station in response to checking the presence of scanning groups formed by the mobile terminals and determining proximities of the scanning groups based on an uplink signal from neighboring base stations to the target base station.

13. The method of claim 12, wherein the target base station performs resource reservation in response to receiving the request for the scan schedule from the target base station, and in response to a channel being available.

14. The method of claim 1, wherein the group of mobile terminals comprises only one mobile terminal in a state of having information of the target base station.

15. The method of claim 1, wherein the remaining time is used to determine an order of resource reservation required to request the handover.

* * * * *